(12) United States Patent
Boes et al.

(10) Patent No.: US 12,065,003 B2
(45) Date of Patent: Aug. 20, 2024

(54) SHEAR BAND CONSTRUCTION

(71) Applicant: The Goodyear Tire & Rubber Company, Akron, OH (US)

(72) Inventors: Claude Ernest Felix Boes, Erpeldange-sur-Sûre (LU); Francesco Sportelli, Bettembourg (LU); Stefan Wilms, Helmdange (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 596 days.

(21) Appl. No.: 17/215,051

(22) Filed: Mar. 29, 2021

(65) Prior Publication Data

US 2022/0305847 A1      Sep. 29, 2022

(51) Int. Cl.
*B60C 9/18*      (2006.01)
*D06H 5/00*      (2006.01)
*D06H 7/02*      (2006.01)

(52) U.S. Cl.
CPC ........... *B60C 9/1807* (2013.01); *D06H 5/007* (2013.01); *D06H 7/02* (2013.01); *B60C 2009/1878* (2013.01); *D10B 2403/0213* (2013.01); *D10B 2505/022* (2013.01)

(58) Field of Classification Search
CPC .............. B60C 9/18; B60C 2009/1871; B60C 2009/1878
See application file for complete search history.

(56) References Cited

U.S. PATENT DOCUMENTS

| | | |
|---|---|---|
| 3,730,244 A | 5/1973 | Ross |
| 3,842,885 A | 10/1974 | Alban |
| 4,459,167 A | 7/1984 | Markow et al. |
| 4,573,510 A | 3/1986 | Ippen et al. |
| 4,600,651 A | 7/1986 | Aufdermarsh et al. |
| 4,601,941 A | 7/1986 | Lutz et al. |
| 4,698,278 A | 10/1987 | Prang |
| 4,734,144 A | 3/1988 | Markow |
| 4,869,307 A | 9/1989 | Bormann et al. |
| 5,004,031 A | 4/1991 | Kadota et al. |
| 5,096,772 A | 3/1992 | Snyder |
| 5,503,940 A | 4/1996 | Majumdar et al. |

(Continued)

FOREIGN PATENT DOCUMENTS

| | | | |
|---|---|---|---|
| EP | 0092498 A3 | 10/1984 | |
| WO | WO-0172536 A1 * | 10/2001 | ............. B60C 17/00 |

OTHER PUBLICATIONS

European Search Report for Serial No. EP22164590 dated Apr. 4, 2023.

*Primary Examiner* — Justin R Fischer (74) *Attorney, Agent, or Firm* — June E. Rickey; Robert N. Lipcsik (57) ABSTRACT

A shear band for a tire includes an annular first, radially outer fabric layer extending circumferentially around the tire; and an annular second, radially inner fabric layer extending circumferentially around the tire. The shear band is formed from a single shear band strip helically wound circumferentially and axially with a first edge of the shear band strip. The first edge of the shear band strip has a first extension flap for engaging an opposite second edge of the shear band strip. The first extension flap is continuously secured to the opposite second edge linearly along the opposite second edge of the shear band strip.

10 Claims, 5 Drawing Sheets

(56) References Cited

U.S. PATENT DOCUMENTS

| | | |
|---|---|---|
| 5,804,002 A | 9/1998 | Nakano |
| 5,837,077 A | 11/1998 | Kabe et al. |
| 6,321,808 B1 | 11/2001 | Spragg et al. |
| 6,460,586 B1 | 10/2002 | Spragg et al. |
| 6,598,634 B1 | 7/2003 | Koch et al. |
| 6,669,793 B2 | 12/2003 | Hays |
| 6,769,465 B2 | 8/2004 | Rhyne et al. |
| 6,994,134 B2 | 2/2006 | Grah |
| 7,013,939 B2 | 3/2006 | Rhyne et al. |
| 7,101,154 B2 | 9/2006 | Dambrine et al. |
| 7,201,194 B2 | 4/2007 | Rhyne et al. |
| 7,407,514 B2 | 8/2008 | Li et al. |
| 7,678,216 B2 | 3/2010 | Sandstrom et al. |
| 8,215,351 B2 | 7/2012 | Thompson |
| 8,813,797 B2 | 8/2014 | Anderson et al. |
| 9,222,204 B2 | 12/2015 | Chen et al. |
| 9,272,576 B2 | 3/2016 | Dotson et al. |
| 9,915,157 B2 | 3/2018 | Oudin et al. |
| 10,011,930 B2 | 7/2018 | Adolphs et al. |
| 10,071,603 B2 | 9/2018 | Sportelli et al. |
| 10,105,989 B2 | 10/2018 | Cron et al. |
| 2011/0253281 A1 | 10/2011 | Christenbury |
| 2016/0121663 A1 | 5/2016 | Sportelli et al. |
| 2017/0008342 A1 | 1/2017 | Martin et al. |
| 2017/0297374 A1 | 10/2017 | Sportelli |
| 2018/0141380 A1 | 5/2018 | Celik |
| 2018/0154694 A1 | 6/2018 | Orlewski et al. |
| 2019/0016076 A1 | 1/2019 | Rivers et al. |
| 2019/0217665 A1 | 7/2019 | Delfino et al. |
| 2019/0283500 A1 | 9/2019 | Wilson et al. |
| 2019/0322137 A1 | 10/2019 | Wilson et al. |

\* cited by examiner

SHEAR BAND CONSTRUCTION

FIELD OF THE INVENTION

The present invention provides an improved shear band for use in non-pneumatic tires, pneumatic tires, and/or other technologies.

BACKGROUND OF THE INVENTION

One conventional example relates to a structurally supported resilient tire supporting a load without internal air pressure. This non-pneumatic tire includes a ground contacting portion and side wall portions that extend radially inward from the tread portion and anchor in bead portions adapted to remain secure to a wheel during rolling of the wheel/tire. A reinforced annular shear band is disposed radially inward of the tread portion. This shear band includes at least one shear layer, a first membrane adhered to the radially inward extent of the shear layer and a second membrane adhered to the radially outward extent of the shear layer. Each of the membranes has a longitudinal tensile modulus sufficiently greater than the dynamic shear modulus of the shear layer so that, when under load, the ground contacting portion of the tire deforms to a flat contact region through shear strain in the shear layer while maintaining constant length of the membranes. Relative displacement of the membranes occurs substantially by shear strain in the shear layer.

Another conventional non-pneumatic tire includes an outer annular shear band and a plurality of web spokes that extend transversely across and radially inward from the shear band and are anchored in a wheel or hub. The shear band may comprise an annular shear layer, a first membrane adhered to the radially inward extent of the shear layer, and a second membrane adhered to the radially outward extent of the shear layer. Under load, this shear band deforms in the contact area with the ground surface through a mechanism that includes shear deformation of the shear band.

As described above, a shear band may provide desirable performance benefits in a tire. As described below, the shear band in accordance with the present invention may further enhance performance capabilities of the tire. This improved construction for the shear band may have application in pneumatic tires, nonpneumatic tires, and other products as well.

SUMMARY OF THE INVENTION

A shear band for a tire in accordance with the present invention includes an annular first, radially outer fabric layer extending circumferentially around the tire; and an annular second, radially inner fabric layer extending circumferentially around the tire. The shear band is formed from a single shear band strip helically wound circumferentially and axially with a first edge of the shear band strip. The first edge of the shear band strip has a first extension flap for engaging an opposite second edge of the shear band strip. The first extension flap is continuously secured to the opposite second edge linearly along the opposite second edge of the shear band strip.

According to another aspect of the shear band, a first planar side of the single shear band strip comprises the first, radially outer fabric layer and a second planar side of the single shear band strip comprises the second, radially inner fabric layer.

According to still another aspect of the shear band, a blade cuts the helically wound shear band strip such that the single helically wound shear band strip has annular parallel opposite edges define the first planar side and the second planar side.

According to yet another aspect of the shear band, the first extension flap is secured to the opposite second edge by stitch-knitting.

According to still another aspect of the shear band, part of the first radially outer fabric layer of the shear band includes the first extension flap.

According to yet another aspect of the shear band, the second edge of the shear band strip has a second extension flap for engaging the opposite first edge of the shear band strip.

According to still another aspect of the shear band, the second edge of the shear band strip has a second extension flap for engaging the opposite first edge of the shear band strip, the second extension flap being continuously secured to the opposite first edge linearly along the second opposite edge of the shear band strip.

According to yet another aspect of the shear band, the second extension flap is continuously secured to the opposite first edge linearly along the first opposite edge of the shear band strip.

According to still another aspect of the shear band, the second extension flap is secured to the opposite first edge by stitch-knitting.

According to yet another aspect of the shear band, part of the second radially outer fabric layer of the shear band includes the second extension flap.

A method constructs a plurality of shear bands for tires. The method includes the steps of: helically winding a single shear band strip about itself to produce a cylindrical structure; securing a first edge of the single shear band strip to a second opposite edge of the single shear band strip by a first flap extending from the first edge of the single shear band strip; and axially and circumferentially cutting the cylindrical structure in multiple locations.

According to another aspect of the method band, the cutting step produces the plurality of annular shear bands with axially opposite parallel sides.

According to still another aspect of the method band, the cutting step produces a first, radially outer fabric layer of each of the plurality of shear bands from a first planar side of the single shear band strip.

According to yet another aspect of the method band, the cutting step produces a second, radially inner fabric layer of each of the plurality of shear bands from a second planar side of the single shear band strip.

According to still another aspect of the method band, a further step includes securing the first flap of the first edge of the single shear band strip to an opposite second edge of the single shear band strip by stitch-knitting.

According to yet another aspect of the method band, the first radially outer fabric layers of each shear band includes part of the first flap extending from the first edge of the single shear band strip.

According to still another aspect of the method band, the second radially inner fabric layers of each shear band includes part of a second flap extending from the second edge of the single shear band strip.

According to yet another aspect of the method band, a further step includes securing the second flap of the second edge of the single shear band strip to an opposite first edge of the single shear band strip by stitch-knitting.

Definitions

As used herein and in the claims:

"Adhering" means binding one item to another item by glue, weld, friction, mechanical engagement, fusion, and/or other method of cohesion.

"Apex" means an elastomeric filler located radially above the bead core and between the plies and the turnup ply.

"Annular" means formed like a ring.

"Aramid" and "Aromatic polyamide" both mean a manufactured fiber in which the fiber-forming substance is generally recognized as a long chain of synthetic aromatic polyamide in which at least 85% of the amide linkages are attached directly to the two aromatic rings. Representative of an aramid or aromatic polyamide is a poly (p-phenylene-terephthalamide).

"Aspect ratio" means the ratio of a tire section height to its section width. For example, the aspect ratio may be the maximum axial distance between the exterior of the tire sidewalls when unloaded and inflated at normal pressure, multiplied by 100% for expression as a percentage. Low aspect ratio may mean a tire having an aspect ratio of 65 and below.

"Aspect ratio of a bead cross-section" means the ratio of a bead section height to its section width.

"Asymmetric tread" means a tread that has a tread pattern not symmetrical about the centerplane or equatorial plane (EP) of the tire.

"Axial" and "axially" refer to lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt structure" means at least two annular layers or plies of parallel cords, woven or unwoven, underlying the tread, unanchored to the bead, and having cords inclined respect to the equatorial plane (EP) of the tire. The belt structure may also include plies of parallel cords inclined at relatively low angles, acting as restricting layers.

"Bias tire" (cross ply) means a tire in which the reinforcing cords in the carcass ply extend diagonally across the tire from bead to bead at about a 25° to 65° angle with respect to equatorial plane (EP) of the tire. If multiple plies are present, the ply cords run at opposite angles in alternating layers.

"Braided tube" means a tubular structure including a cord/filament/strand/strip with usually three or more component strands forming a regular diagonal pattern down its length. The tube structure may be a narrow, ropelike band formed by plaiting or weaving together several strands. Braiding may result in an interlaced fabric tube with crossing strips laid together in diagonal formation thereby forming a narrow strip of tubular fabric, which may be flattened to form a flattened tube strip and/or layer.

"Breakers" means at least two annular layers or plies of parallel reinforcement cords having the same angle with reference to the equatorial plane (EP) of the tire as the parallel reinforcing cords in carcass plies. Breakers are usually associated with bias tires.

"Cable" means a cord formed by twisting together two or more plied yarns.

"Carcass" means the tire structure apart from the belt structure, tread, undertread, and sidewall rubber over the plies, but including the beads.

"Casing" means the carcass, belt structure, beads, sidewalls, and all other components of the tire excepting the tread and undertread, i.e., the whole tire.

"Chipper" refers to a narrow band of fabric or steel cords located in the bead area whose function is to reinforce the bead area and stabilize the radially inwardmost part of the sidewall.

"Circumferential" and "circumferentially" mean lines or directions extending along the perimeter of the surface of the annular tire parallel to the equatorial plane (EP) and perpendicular to the axial direction; it can also refer to the direction of the sets of adjacent circular curves whose radii define the axial curvature of the tread, as viewed in cross section.

"Composite", as used herein, means constructed from two or more layers.

"Cord" means one of the reinforcement strands of which the reinforcement structures of the tire are comprised.

"Cord angle" means the acute angle, left or right in a plan view of the tire, formed by a cord with respect to the equatorial plane (EP). The "cord angle" is measured in a cured but uninflated tire.

"Cord twist" means each yarn of the cord has its component filaments twisted together a given number of turns per unit of length of the yarn (usually expressed in turns per inch (TPI) or turns per meter (TPM)) and additionally the yarns are twisted together a given number of turns per unit of length of the cord. The direction of twist refers to the direction of slope of the spirals of a yarn or cord when it is held vertically. If the slope of the spirals conforms in direction to the slope of the letter "S", then the twist is called "S" or "left hand". If the slope of the spirals conforms in direction to the slope of the letter "Z", then the twist is called "Z" or "right hand". An "S" or "left hand" twist direction is understood to be an opposite direction from a "Z" or "right hand" twist. "Yarn twist" is understood to mean the twist imparted to a yarn before the yarn is incorporated into a cord, and "cord twist" is understood to mean the twist imparted to two or more yarns when they are twisted together with one another to form a cord. "dtex" is understood to mean the weight in grams of 10,000 meters of a yarn before the yarn has a twist imparted thereto.

"Cut belt ply" refers to a belt having a width less than the tread width, which lies flat over the carcass plies in the crown area of the tire.

"Crown" means that portion of the tire in the proximity of the tire tread.

"Denier" means the weight in grams per 9000 meters (unit for expressing linear density). "Dtex" means the weight in grams per 10,000 meters.

"Density" means weight per unit length.

"Dynamic shear modulus" means the shear modulus measured per ASTM D5992.

"Elastomer" means a resilient material capable of recovering size and shape after deformation.

"Elongation at break" means the tensile elongation as measured by ASTM D412-98a and conducted at 100° C. rather than ambient.

"Equatorial plane (EP)" means the plane perpendicular to the tire's axis of rotation and passing through the center of its tread; or the plane containing the circumferential centerline of the tread.

"Evolving tread pattern" means a tread pattern, the running surface of which, which is intended to be in contact with the road, evolves with the wear of the tread resulting from the travel of the tire against a road surface, the evolution being predetermined at the time of designing the tire, so as to obtain adhesion and road handling performances which remain substantially unchanged during the entire period of use/wear of the tire, no matter the degree of wear of the tread.

"Fabric" means a network of essentially unidirectionally extending cords, which may be twisted, and which in turn are composed of a plurality of a multiplicity of filaments (which may also be twisted) of a high modulus material.

"Fiber" is a unit of matter, either natural or man-made, that forms the basic element of filaments; characterized by having a length at least 100 times its diameter or width.

"Filament count" means the number of filaments that make up a yarn. Example: 1000 denier polyester has approximately 190 filaments.

"Flipper" refers to a reinforcing fabric around the bead wire for strength and to tie the bead wire in the tire body.

"Footprint" means the contact patch or area of contact of the tire tread with a flat surface at zero speed and under normal load and pressure.

"Gauge" refers generally to a measurement, and specifically to a thickness measurement.

"Groove" means an elongated void area in a tread that may extend circumferentially or laterally about the tread in a straight, curved, or zigzag manner. Circumferentially and laterally extending grooves sometimes have common portions. The "groove width" may be the tread surface occupied by a groove or groove portion divided by the length of such groove or groove portion; thus, the groove width may be its average width over its length. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves, which they interconnect, they may be regarded as forming "tie bars" tending to maintain a rib-like character in the tread region involved. As used herein, a groove is intended to have a width large enough to remain open in the tires contact patch or footprint.

"High tensile steel (HT)" means a carbon steel with a tensile strength of at least 3400 MPa at 0.20 mm filament diameter.

"Hysteresis" means a dynamic loss tangent (e.g., max tan delta). The dynamic characteristics of the materials are measured on an MTS 831 Elastomer Test System in accordance with ASTM D5992. The response of a sample of vulcanized material (cylindrical test piece of a thickness of 4 mm and a section of 400 mm$^2$), subjected to an alternating single sinusoidal shearing stress, at a frequency of 10 Hz and at 80° C., is recorded. Scanning is conducted at an amplitude of deformation of 0.1 percent to 50 percent (outward cycle), then of 50 percent to 0.1 percent (return cycle). The maximum shear modulus G max in MPa and the maximum value of the tangent of the loss angle tan delta (max tan delta) is determined during the outward cycle.

"Inner" means toward the inside of the tire and "outer" means toward its exterior.

"Innerliner" means the layer or layers of elastomer or other material that form the inside surface of a tubeless tire and that contain the inflating fluid within the tire.

"Inboard side" means the side of the tire nearest the vehicle when the tire is mounted on a wheel and the wheel is mounted on the vehicle.

"Knitting" means a method by which yarn is manipulated to create a textile or fabric. Knitting may create multiple loops of yarn, called stitches, in a line or a tube. Knitted fabric may consist of a number of consecutive rows of intermeshing loops.

"LASE" is load at specified elongation.

"Lateral" means an axial direction.

"Lay length" means the distance at which a twisted filament or strand travels to make a 360° rotation about another filament or strand.

"Load range" means load and inflation limits for a given tire used in a specific type of service as defined by tables in The Tire and Rim Association, Inc.

"Modulus" of a test specimen means the tensile modulus of elasticity at 1 percent elongation in the circumferential direction of the tire multiplied by the effective thickness of the test specimen.

"Mega tensile steel (MT)" means a carbon steel with a tensile strength of at least 4500 MPa at 0.20 mm filament diameter.

"Meridian plane" means a plane parallel to the axis of rotation of the tire and extending radially outward from the axis.

"Net contact area" means the total area of ground contacting elements between defined boundary edges as measured around the entire circumference of the tread.

"Net-to-gross ratio" means the total area of ground contacting tread elements between lateral edges of the tread around the entire circumference of the tread divided by the gross area of the entire circumference of the tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Normal load" means the specific design inflation pressure and load assigned by the appropriate standards organization for the service condition for the tire.

"Normal tensile steel (NT)" means a carbon steel with a tensile strength of at least 2800 MPa at 0.20 mm filament diameter.

"Outboard side" means the side of the tire farthest away from the vehicle when the tire is mounted on a wheel and the wheel is mounted on the vehicle.

"Ply" means a cord-reinforced layer of rubber-coated radially deployed or otherwise parallel cords.

"Radial" and "radially" mean directions radially toward or away from the axis of rotation of the tire.

"Radial ply structure" means the one or more carcass plies or which at least one ply has reinforcing cords oriented at an angle of between 65° and 90° with respect to the equatorial plane (EP) of the tire.

"Radial ply tire" means a belted or circumferentially-restricted pneumatic tire in which at least one ply has cords which extend from bead to bead and the ply is laid at cord angles between 65° and 90° with respect to the equatorial plane (EP) of the tire.

"Rib" means a circumferentially extending strip of rubber on the tread which is defined by at least one circumferential groove and either a second such groove or a lateral edge, the strip being laterally undivided by full-depth grooves.

"Rivet" means an open space between cords in a layer.

"Section height" means the radial distance from the nominal rim diameter to the outer diameter of the tire at its equatorial plane (EP).

"Section width" means the maximum linear distance parallel to the axis of the tire and between the exterior of its sidewalls when and after it has been inflated at normal pressure for 24 hours, but unloaded, excluding elevations of the sidewalls due to labeling, decoration, or protective bands.

"Self-supporting run-flat" means a type of tire that has a structure wherein the tire structure alone is sufficiently strong to support the vehicle load when the tire is operated in the uninflated condition for limited periods of time and limited speed. The sidewall and internal surfaces of the tire may not collapse or buckle onto themselves due to the tire structure alone (e.g., no internal structures).

"Sidewall insert" means elastomer or cord reinforcements located in the sidewall region of a tire. The insert may be an addition to the carcass reinforcing ply and outer sidewall rubber that forms the outer surface of the tire.

"Sidewall" means that portion of a tire between the tread and the bead.

"Sipe" or "incision" means small slots molded into the tread elements of the tire that subdivide the tread surface and improve traction; sipes may be designed to close when within the contact patch or footprint, as distinguished from grooves.

"Spring rate" means the stiffness of tire expressed as the slope of the load deflection curve at a given pressure.

"Stiffness ratio" means the value of a control belt structure stiffness divided by the value of another belt structure stiffness when the values are determined by a fixed three point bending test having both ends of the cord supported and flexed by a load centered between the fixed ends.

"Super tensile steel (ST)" means a carbon steel with a tensile strength of at least 3650 MPa at 0.20 mm filament diameter.

"Tenacity" means stress expressed as force per unit linear density of the unstrained specimen (gm/tex or gm/denier).

"Tensile stress" is force expressed in force/cross-sectional area. Strength in psi=12,800 times specific gravity times tenacity in grams per denier.

"Tension" for a cord means force on the cord expressed as mN/tex.

"Toe guard" refers to the circumferentially deployed elastomeric rim-contacting portion of the tire axially inward of each bead.

"Tread" means a molded rubber component which, when bonded to a tire casing, includes that portion of the tire that comes into contact with the road when the tire is normally inflated and under normal load.

"Tread element" or "traction element" means a rib or a block element.

"Tread width" means the arc length of the tread surface in a plane including the axis of rotation of the tire.

"Turns per inch", or TPI, means turns of cord twist for each inch length of cord.

"Turnup end" means the portion of a carcass ply that turns upward (i.e., radially outward) from the beads about which the ply is wrapped.

"Ultra tensile steel (UT)" means a carbon steel with a tensile strength of at least 4000 MPa at 0.20 mm filament diameter.

"Vertical deflection" means the amount that a tire deflects under load.

"Weaving" means a method of textile production in which two distinct sets of yarns or threads are interlaced at right angles to form a fabric or layer. The longitudinal yarns or threads may be called the warp and the lateral yarns or threads may be called weft or filling.

"Wheel" or "hub" means a structure for supporting the tire and mounting to the vehicle axle.

"Yarn" is a generic term for a continuous strand of textile fibers or filaments. Yarn occurs in the following forms: (1) a number of fibers twisted together; (2) a number of filaments laid together without twist; (3) a number of filaments laid together with a degree of twist; (4) a single filament with or without twist (monofilament); and (5) a narrow strip of material with or without twist.

BRIEF DESCRIPTION OF THE DRAWINGS

A full and enabling disclosure of examples of the present invention, directed to one of ordinary skill in the art, is set forth in the specification with reference to the appended figures, in which.

Similar numerals refer to similar parts throughout the drawings.

DETAILED DESCRIPTION OF EXAMPLES OF THE PRESENT INVENTION

Reference will now be made in detail to examples of the present invention, one or more examples of which are illustrated in the figures. These examples may be used in tires, such as described in the example tire of U.S. Pat. No. 10,071,603, incorporated herein by reference in its entirety. Each example is provided by way of explanation of the present invention, and not meant as a limitation of the present invention. For example, features illustrated or described as part of one example may be used with another example to yield still a third example. It is intended that the present invention include these and other modifications and variations. It should be noted that for the purposes of discussion, only part of example tires may be depicted in one or more of the figures. One of ordinary skill in the art, using the teachings disclosed herein, will understand that the same or substantially similar features may be repeated in other parts the example tires.

The present invention provides an improved shear band that may be used in a variety of products including, for example, non-pneumatic tires, pneumatic tires, and/or other technologies. One example shear band may be constructed as a composite comprised of individual knitted layers, which may be, in turn, constructed from certain materials having specific physical properties that, when combined in a particular manner as described herein, may provide overall physical properties and performance characteristics desirably exceeding that which would be obtained from a shear band constructed from only one of the individual materials. By way of example only, improvements in rolling resistance and tire design flexibility may be obtained.

Conventional shear band materials may be replaced by ultra-light, three-dimensional, knitted fabric layers, as described herein. In other applications, computerized weft and warp machines may develop three-dimensional textiles with improved physical, thermal, and/or mechanical properties. These textiles may be used in aerospace, automobile, geotechnical, marine, medical, and/or other applicable industries. Within this family of textiles, knitted three-dimensional fabrics may define a structure of two independent top and bottom layers (also called skins) interconnected, but kept apart, by a spacer layer. This type of structure may be manufactured by weft or warp knitting, with warp knitting being most common. During a knitting cycle, the top and bottom layers may be knitted simultaneously using a double-needle machine.

The example knitted multifilament yarns may define the top and bottom layers, while monofilament yarns (or piles) may define the spacer layer. The example shear band may further comprise a first rubber layer secured to the top layer and a second rubber layer secured to the bottom layer. The shear band may be split at intervals by a material, such as polyurethane or similar fibers. The thickness of the shear band may be between 7.0 mm and 10.0 mm. The multifilament yarns of the top and bottom layers and the monofilament yards of the spacer layer may be formed of polyester or other suitable material.

Figure 1:
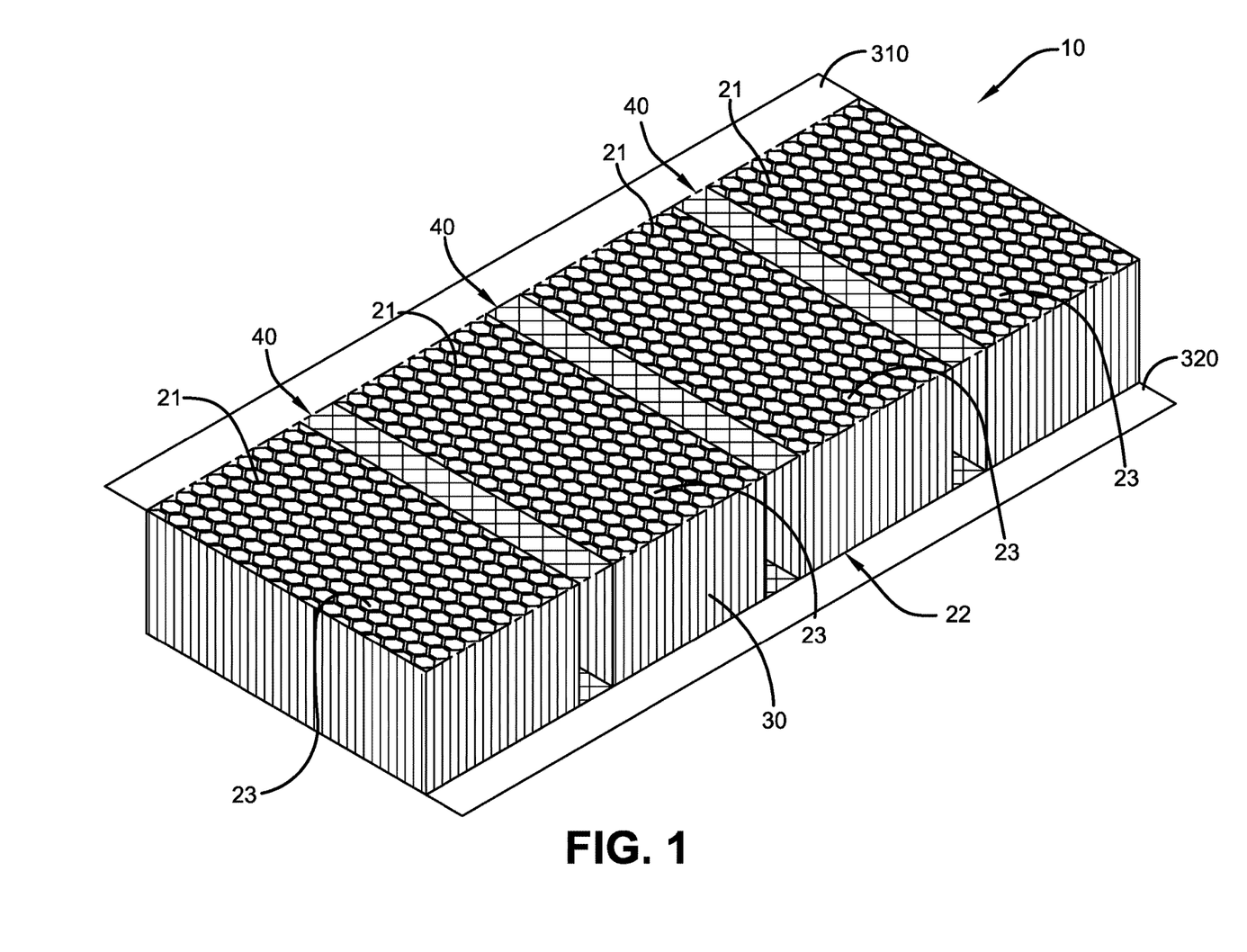
FIG. 1 is a schematic perspective view of part of an example shear band for use with the present invention.
Figure 2:
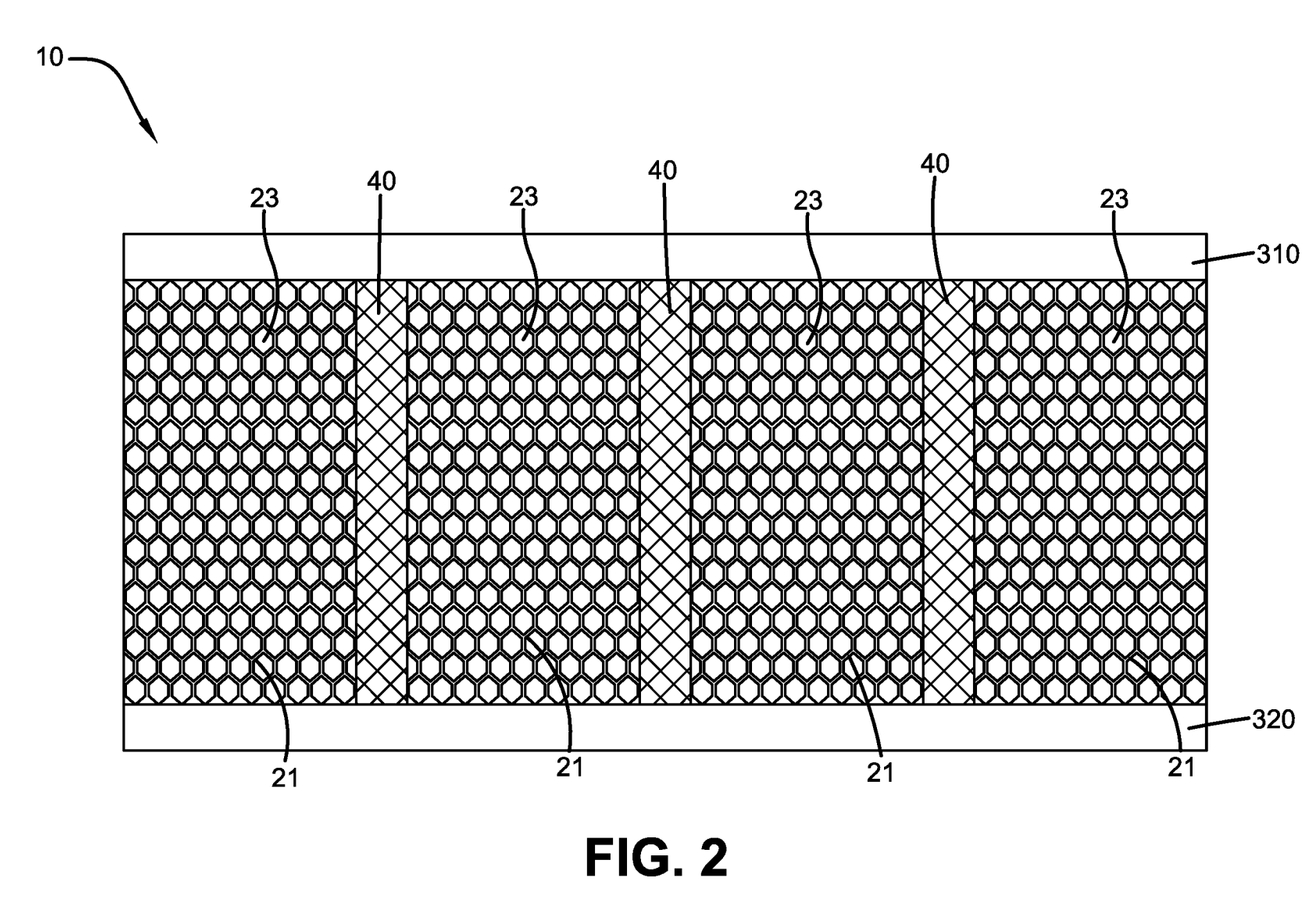
FIG. 2 is schematic top view of the part of FIG. 1.
Figure 3:
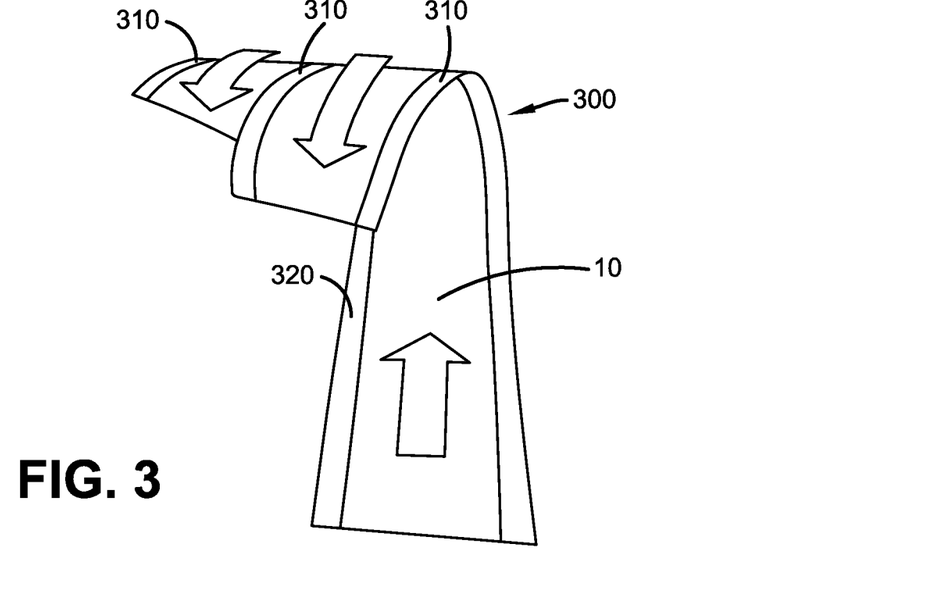
FIG. 3 is a schematic perspective view of the shear band of FIG. 1.
Figure 4:
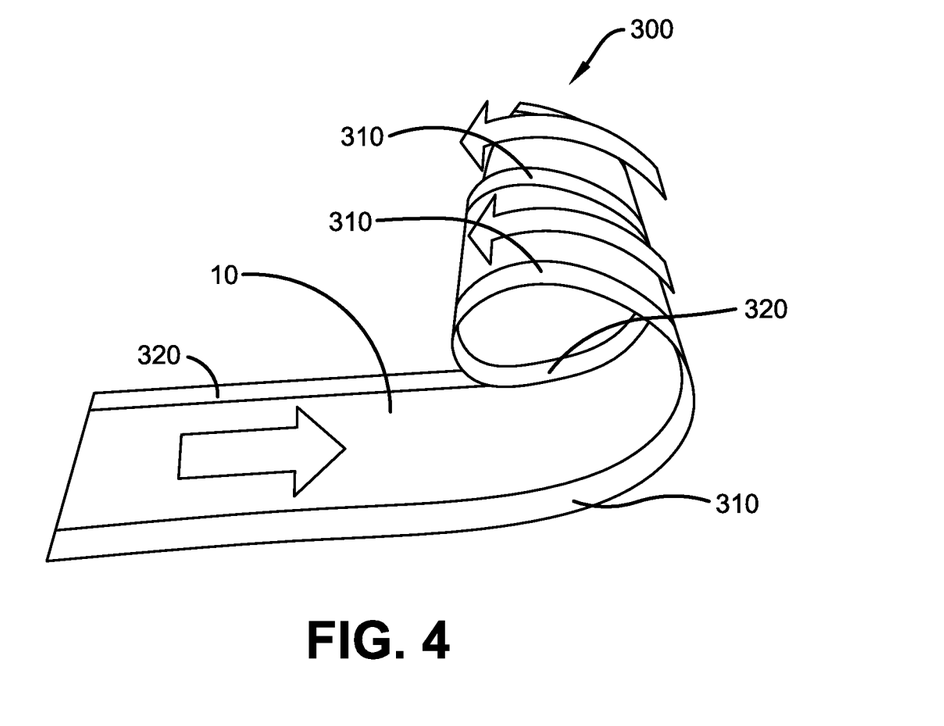
FIG. 4 is another schematic perspective view the shear band of FIG. 1.
Figure 5:
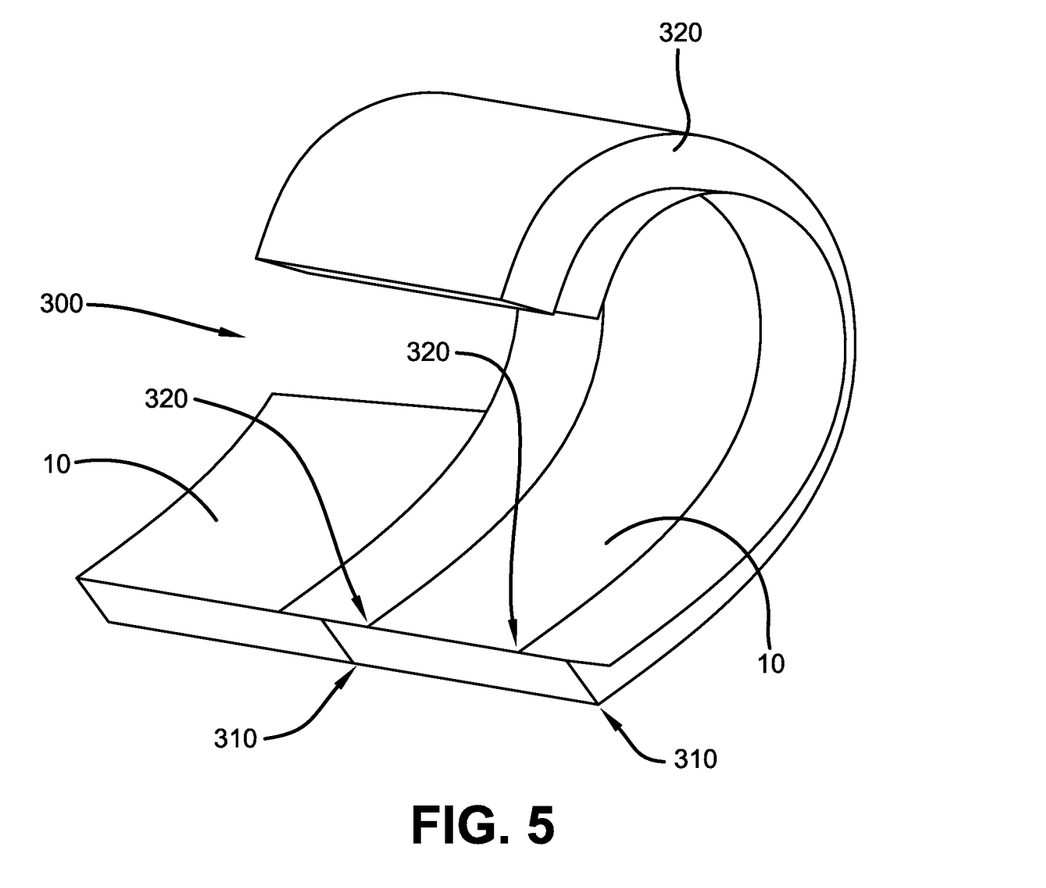
FIG. 5 is still another schematic perspective view the shear band of FIG. 1.

As shown in FIGS. 1-2, an example shear band strip 10 in accordance with the present invention may include a first top rubber layer, a first top fabric layer 21 secured to the first top rubber layer, a second bottom rubber layer, a second bottom fabric layer 22 secured to the second bottom rubber layer, and a spacer layer 30 radially interconnecting the first top fabric layer and the second bottom fabric layer. The layers 21, 22, 30 may be split into regular parts by longitudinal spacer sections 40 of elastic polyurethane and/or other suitable material.

The first top fabric layer 21 and the second bottom fabric layer 22 may be constructed of multifilament yarns of suitable material. Multifilament yarns may be composed of continuous filaments aligned in parallel rows which run straight except when they are coiled by the insertion of a twist, giving the yarns an appearance of evenness or smoothness and an absence of hairiness. Most of the filaments may not require sizing. However, sizing may improve their efficiency by a further 15-20%. Sizing may improve frictional resistance of the yarn and may bond the filaments preventing peeling back and intermingling of any broken filaments which are present on the yarn before weaving or may break during weaving. In order to achieve this, the selected size of the filaments may have sufficient adhesion to the fibers to make the filaments cohere. The multifilament yarns may form a pattern with vacant spaces 23 (FIGS. 1-2) for reducing weight. The vacant spaces 23 may be any suitable shape, such as hexagonal (FIGS. 1-2), square, orthogonal, nonogonal, triangular, etc.

The example spacer layer 30 may be constructed of monofilament yarns of suitable material. Monofilament yarns may consist of a single solid filament. Monofilament yarns may be circular and solid in cross section. The shape of the filament may be altered to produce noncircular filaments, hollow filaments, and/or other shaped monofilaments. The diameter range of monofilament yarns may be between 100.0 μm and 2000.0 μm. Examples of monofilament yarns may include fishing line, dental floss, sport racquet strings, bristles of tooth brushes, and/or other suitable uses. Hollow monofilaments may be used in softer sewing thread applications while elastomeric monofilaments may find applications in pressure layers, such as the spacer layer 30. The monofilaments of the spacer layer 30 may be attached to the fabric layers 21, 22 in any suitable manner, such as knitting or weaving the monofilaments directly into the fabric layers.

Figure 6:
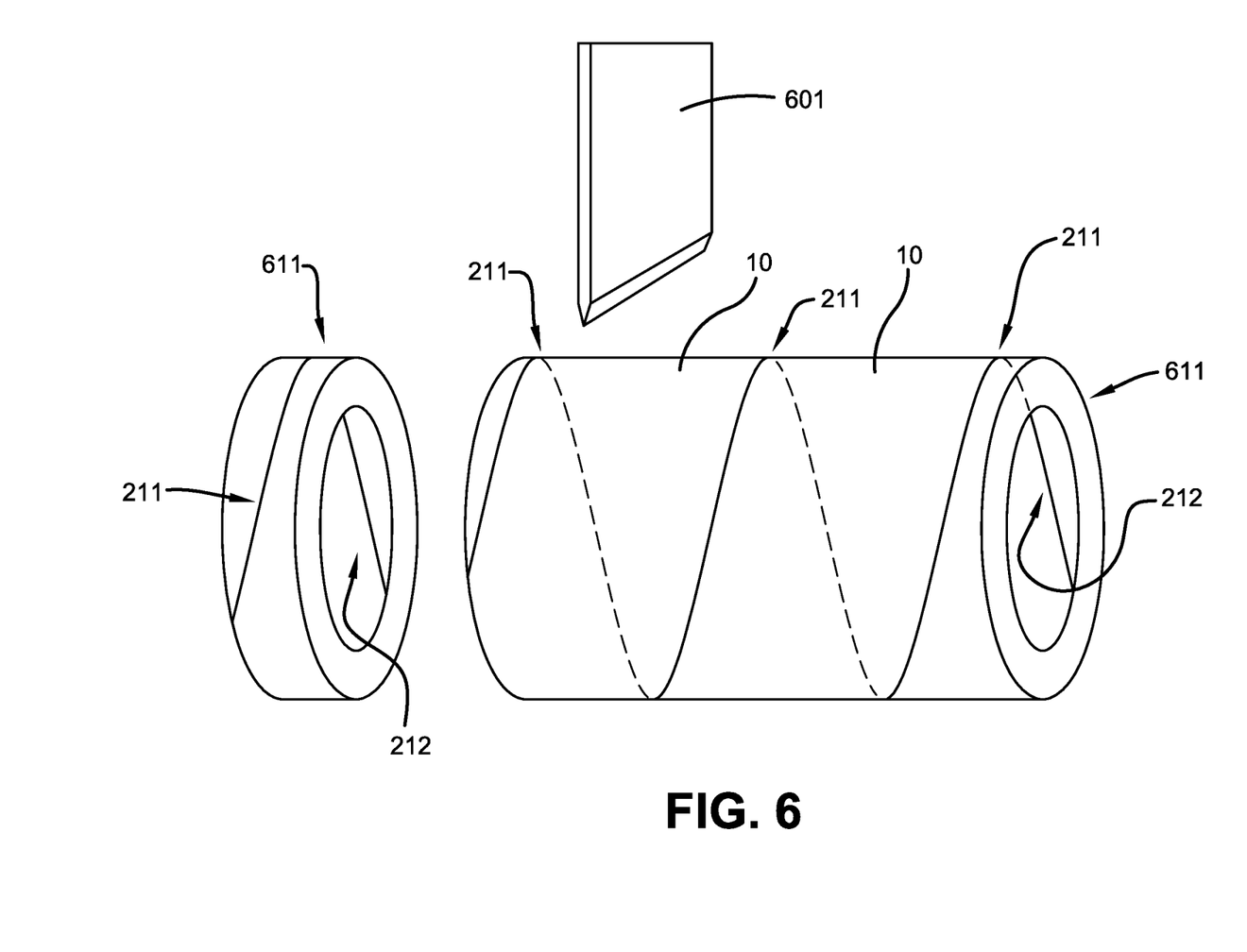
FIG. 6 is a schematic perspective view of the shear band of FIG. 1 spirally wound into a cylinder in accordance with the present invention.

In accordance with the present invention, a ring-structure 300 may be formed by the shear band strip 10 by stich-knitting an over-lap first extension flap 310 of the first top fabric layer 21 to another, radially outer first portion 211 of the same first top fabric layer 21 so as to construct the helically wound annular ring-structure 300 (FIGS. 3-6). The resulting ring-structure 300 may thereby be axially and circumferentially cut, such as by a blade 601, to form parallel annular rings 611 for use as a shear band for an exemplary tire, such as a non-pneumatic tire shear band or a pneumatic tire belt/overlay structure. The second bottom fabric layer 22 may additionally have a second extension flap 320 for stitch-knitting to another second radially inner portion 212 of the second bottom fabric layer 22 (FIG. 6).

Stitch-knitting may be conducted with a stich-knitting arm (not shown) entering an interior of the helical structure 300 from one axial end and approaching the second, radially inner extension flap 320 obliquely so that the second, radially inner extension flap 320 be stitched to the same second, radially inner portion 212 of second bottom fabric layer 22 (FIG. 6). The stitch-knitting arm may also proceed axially across an exterior of the helical structure 300 and approaching the first, radially outer extension flap 310 obliquely from one axial end so that the first, radially outer extension flap 310 be stitched to the same first, radially outer portion 211 of first top fabric layer 21 (FIG. 6). These stitch-knitting steps may be conducted in any sequential order. Once the blade 601 separates the rings 611, the rings may thereby form helically secured internally and externally discrete annular rings 611 for use as shear bands and/or belt/overlay structures, as described above.

The shear band strip 10 may be a composite between a tread and a supporting structure connected to an axle-hub. The shear band strip 10 may be constructed as a ring of rubber or reinforced rubber. The shear band strip 10 may also be constructed of a composite of rubber (an/or reinforced rubber) and other materials. One such material may be a 3D-woven material (FIG. 1). As described above, the shear band strip 10 may be a ring-shaped 3D-fabric material. The 3D-woven material may be constructed on a specialized machine which may introduce filaments via knitting-needles from top and bottom onto a bed of horizontally pre-layered filaments. Thus, there may be no independently generated top or bottom fabrics, but one entire 3D-construction made in step. The extension flaps 310, 320 may be generated by extending the non-3D edges. The shear band strip 10 may thereby comprise a ring-shaped 3D-fabric sandwiched between two rubber layers. The ring-shaped 3D-fabric may be directly connected to a tread-layer and a support-structure.

One of ordinary skill in the art will understand that numerous examples of the present invention may be created that fall within the present disclosure and claims that follow. It should be understood that the present invention includes various modifications that may be made to the examples described herein that come within the scope of the appended claims and their equivalents, as determined by one of ordinary skill in the art.

What is claimed:

1. A shear band for a tire comprising:
    an annular first, radially outer fabric layer extending circumferentially around the tire; and an annular second, radially inner fabric layer extending circumferentially around the tire, the shear band being formed from a single shear band strip helically wound circumferentially and axially with a first edge of the shear band strip, the first edge of the shear band strip having a first extension flap for engaging an opposite second edge of the shear band strip, the first extension flap being continuously secured to the opposite second edge linearly along the second opposite edge of the shear band strip.

2. The shear band as set forth in claim 1 wherein a first planar side of the single shear band strip comprises the first, radially outer fabric layer and a second planar side of the single shear band strip comprises the second, radially inner fabric layer.

3. The shear band as set forth in claim 2 wherein a blade cuts the helically wound shear band strip such that the single helically wound shear band strip has annular parallel opposite edges define the first planar side and the second planar side.

4. The shear band as set forth in claim 1 wherein the first extension flap is secured to the opposite second edge by stitch-knitting.

5. The shear band as set forth in claim 1 wherein part of the first radially outer fabric layer of the shear band includes the first extension flap.

6. The shear band as set forth in claim 1 wherein the second edge of the shear band strip has a second extension flap for engaging the opposite first edge of the shear band strip.

7. The shear band as set forth in claim 6 wherein the second edge of the shear band strip has a second extension flap for engaging the opposite first edge of the shear band strip, the second extension flap being continuously secured to the opposite first edge linearly along the second opposite edge of the shear band strip.

8. The shear band as set forth in claim 6 wherein the second extension flap is continuously secured to the opposite first edge linearly along the first opposite edge of the shear band strip.

9. The shear band as set forth in claim 6 wherein the second extension flap is secured to the opposite first edge by stitch-knitting.

10. The shear band as set forth in claim 6 wherein part of the second radially outer fabric layer of the shear band includes the second extension flap.

* * * * *